US009853547B2

(12) United States Patent
Bandyopadhyay et al.

(10) Patent No.: US 9,853,547 B2
(45) Date of Patent: Dec. 26, 2017

(54) METHODS AND APPARATUS FOR ADAPTIVE TIMING FOR ZERO VOLTAGE TRANSITION POWER CONVERTERS

(71) Applicant: Texas Instruments Incorporated, Dallas, TX (US)

(72) Inventors: Saurav Bandyopadhyay, Dallas, TX (US); Thomas Matthew LaBella, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/396,466

(22) Filed: Dec. 31, 2016

(65) Prior Publication Data
US 2017/0302179 A1 Oct. 19, 2017

Related U.S. Application Data

(60) Provisional application No. 62/322,004, filed on Apr. 13, 2016.

(51) Int. Cl.
*H02M 3/158* (2006.01)
*H02M 1/08* (2006.01)
*H02M 1/00* (2006.01)

(52) U.S. Cl.
CPC ........... *H02M 3/158* (2013.01); *H02M 1/08* (2013.01); *H02M 2001/0058* (2013.01)

(58) Field of Classification Search
CPC ...... H02M 1/32; H02M 1/4208; H02M 1/081; H02M 1/088; H02M 3/156; H02M 3/1588;
(Continued)

(56) References Cited

U.S. PATENT DOCUMENTS 5,594,635 A   1/1997 Gegner
5,684,688 A   11/1997 Rouaud et al.
(Continued)

FOREIGN PATENT DOCUMENTS

CN   104201884   10/2014
JP   H07123707   12/1994

OTHER PUBLICATIONS

Asad Abidi et al., "Understanding the Regenerative Comparator Circuit" Electrical Engineering Department, University of California, Los Angeles, 2014 IEEE, 8 pgs.
(Continued)

*Primary Examiner* — Jue Zhang
*Assistant Examiner* — Kevin H Sprenger
(74) *Attorney, Agent, or Firm* — John R. Pressetto; Charles A. Brill; Frank D. Cimino

(57) ABSTRACT

An example apparatus includes a first switch having a control terminal, coupled to a voltage source and coupled to a switch node; a second switch having a control terminal, coupled to the switch node and to a voltage reference; a first inductor coupled to the switch node and to a load; a third switch having a control terminal, coupled to the voltage source and to an auxiliary node; a fourth switch having a control terminal, coupled to the auxiliary node and to the voltage reference; a second inductor coupled to the switch node and the auxiliary node; a fifth switch having a control terminal, coupled to the switch node and to the auxiliary node; and timing circuitry configured to output signals to the control terminals of the first switch, the second switch, the third switch, the fourth switch and the fifth switch to supply current to the load.

20 Claims, 9 Drawing Sheets

(58) Field of Classification Search
CPC .... H02M 3/1584; H02M 3/158; H02M 3/157;
H02M 3/33507; H02M 3/1563; H02M
3/155; H02M 3/135; H02M 3/137; H02M
3/10; H02M 3/33592; H02M 3/33523;
H02M 2001/0012; H02M 2001/0032;
H02M 2001/0009; H02M 2001/0025;
H02M 7/7575; H02M 7/06; H02M 7/068;
H02M 7/10; H02M 7/217; H02M 7/219;
H02M 7/1555; H02M 7/155; H02M
7/1623; H02M 7/1626; H02M 7/537;
H02M 7/5387; H02M 7/538; H02M
7/53871; H02M 7/003; H02M 7/53846;
H02M 7/53806; H02M 7/5381; Y02B
70/1466; Y02B 70/1475; Y02B 70/1441;
H01L 25/03112; H01L 2924/3011; H02J
9/062
USPC .......................... 323/282–288; 363/123–134
See application file for complete search history.

(56) References Cited

U.S. PATENT DOCUMENTS

| | | | |
|---|---|---|---|
| 6,462,963 | B1 | 10/2002 | Wittenbreder |
| 7,940,033 | B2 | 5/2011 | Dowlatabadi |
| 8,259,421 | B2 | 9/2012 | Nakahashi et al. |
| 9,172,299 | B2 | 10/2015 | Hamza et al. |
| 2009/0027027 | A1* | 1/2009 | Lin ................... H02M 3/158 323/285 |
| 2009/0134855 | A1 | 5/2009 | Landwehr |
| 2009/0140706 | A1* | 6/2009 | Taufik ............... H02M 3/1584 323/272 |
| 2009/0237042 | A1 | 9/2009 | Glovinski |
| 2010/0061122 | A1 | 3/2010 | Okubo et al. |
| 2011/0149610 | A1 | 6/2011 | Moussaoui et al. |
| 2012/0218785 | A1 | 8/2012 | Li et al. |
| 2013/0093403 | A1 | 4/2013 | Jia et al. |
| 2013/0235631 | A1 | 9/2013 | Pahlevaninezhad et al. |
| 2013/0249520 | A1* | 9/2013 | Oikarinen ............. H02M 3/158 323/285 |
| 2014/0152271 | A1 | 6/2014 | Jeong et al. |
| 2014/0177300 | A1 | 6/2014 | Lagroce et al. |
| 2014/0232359 | A1 | 8/2014 | Dash et al. |
| 2014/0266130 | A1* | 9/2014 | Chiang ................ H02M 3/156 323/311 |
| 2015/0002115 | A1 | 1/2015 | Shenoy et al. |
| 2015/0022170 | A1 | 1/2015 | Chen |
| 2015/0326123 | A1 | 11/2015 | Fukushima et al. |

OTHER PUBLICATIONS

Behzad Razavi, "The StrongARM Latch", A Circuit for All Seasons, IEEE Solid-State Circuits Magazine, Spring 2015, pp. 12-17.

http://escholarship.org/us/item/6st6k2nz, 2.5.4 Comparator Design, pp. 27-28, 2013.

Jing Xue, Ho Lee, "A 2MHz 12-to-100V 90%-Efficiency Self-Balancing ZVS Three-Level DC-DC Regulator with Constant-Frequency AOT V2 Control and 5ns ZVS Turn-On Delay", ISSCC 2016 / Session 12 / Efficient Power Conversion / 12.5, 2016 IEEE International Solid-State Circuits Conference, Digest of Technical Papers, pp. 226-228.

International Search Report from corresponding PCT Application No. PCT/US2016/069149, dated May 25, 2017 (2 pages).

G. Hua, C.-S. Leu, Y. Jiang, and F. C. Lee, "Novel Zero-Voltage-Transition PWM Converters," IEEE Trans. Power Electron., vol. 9, No. 2, pp. 213-219, Mar. 1994, The Institute of Electrical and Electronics Engineers, Inc., 3 Park Avenue, 17th Floor, New York, N.Y. 10016-5997, U.S.A., accessed Dec. 31, 2016, https://www.researchgate.net/profile/Ching-Shan_Leu/publication/3279321_Novel_zero-voltage-PWM_converters.

J. Hua, C.-S. Leu, Y. Jiang, and F. C. Lee, "Novel Zero-Voltage-Transition PWM Converters," IEEE Trans. Power Electron., vol. 9, No. 2, pp. 213-219, Mar. 1994, The Institute of Electrical and Electronics Engineers, Inc., 3 Park Avenue, 17th Floor, New York, N.Y. 10016-5997, U.S.A., accessed Dec. 31, 2016, https://www.researchgate.net/profile/Ching-Shan_Leu/publication/3279321_Novel_zero-voltage-transition_PWM_converters.

International Search Report from corresponding PCT Application No. PCT/US2017/027452, dated Aug. 24, 2017 (2 pages).

* cited by examiner

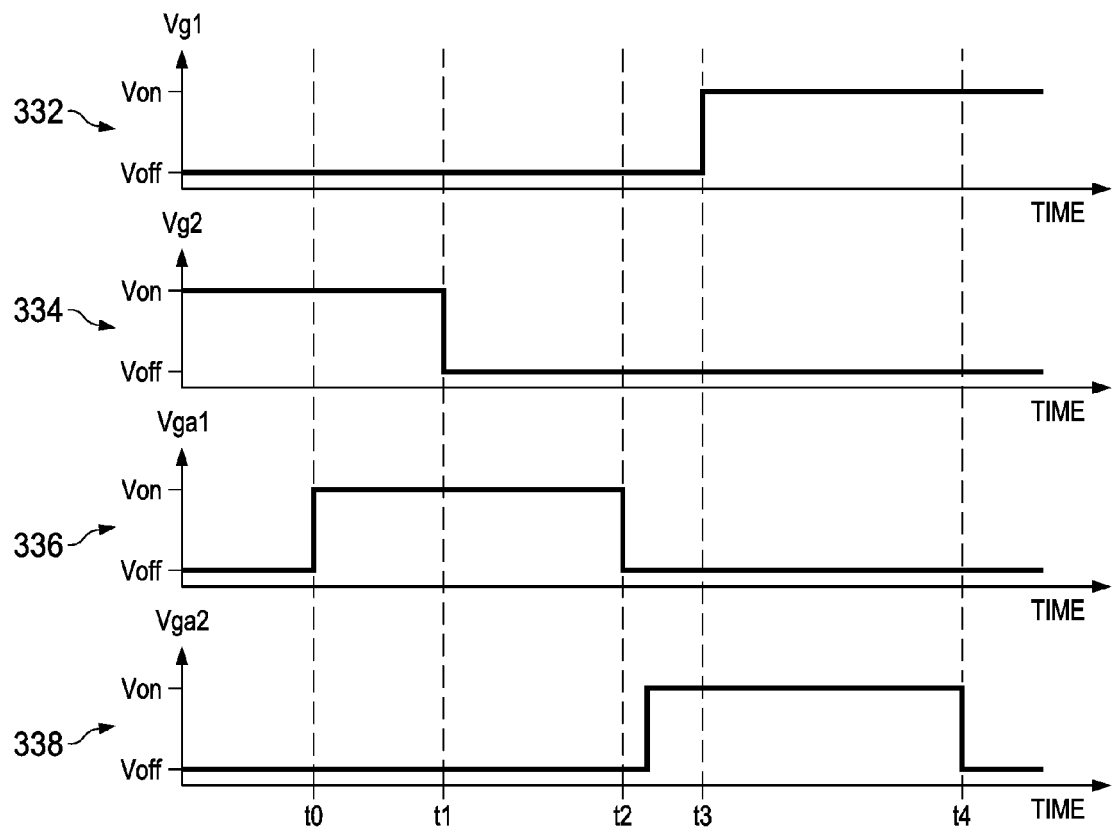
FIG. 3
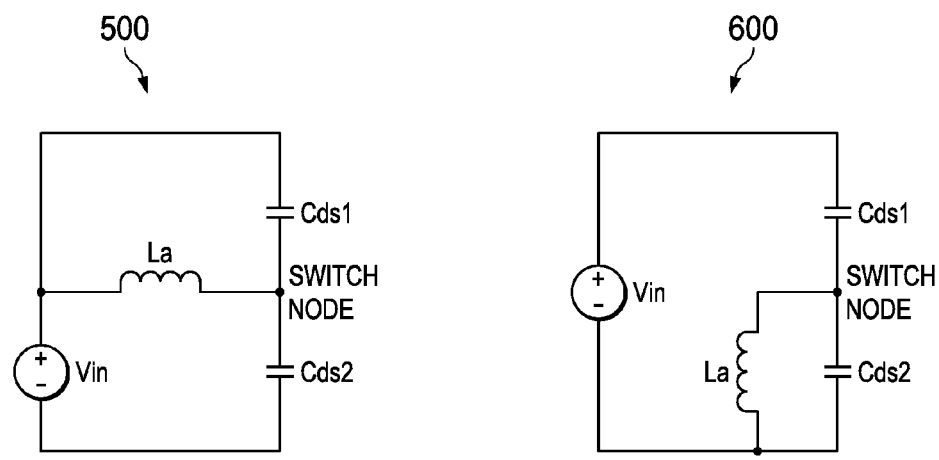
FIG. 5
FIG. 6

METHODS AND APPARATUS FOR ADAPTIVE TIMING FOR ZERO VOLTAGE TRANSITION POWER CONVERTERS

CROSS-REFERENCE TO RELATED APPLICATIONS

This application claims the benefit of priority under 35 U.S.C. §119(e) to co-owned U.S. Provisional Patent Application Ser. No. 62/322,004, filed Apr. 13, 2016, entitled "Adaptive Timing Method for Zero Voltage Transition Power Converters," naming Bandyopadhyay, et al. as inventors, which is hereby incorporated by reference in its entirety herein. In addition, this application is related to co-owned and co-assigned U.S. patent application Ser. No. 14/982,750 ("the '750 Application,") filed Apr. 14, 2016, entitled "Methods and Apparatus for Resonant Energy Minimization in Zero Voltage Transition Power Converters" naming LaBella et al. as inventors, and to co-owned and co-assigned U.S. patent application Ser. No. 15/350,697, filed Nov. 12, 2016, entitled "Methods and Apparatus for Adaptive Timing for Zero Voltage Transition Power Converters," naming LaBella et al. as inventors, and to co-owned and co-assigned U.S. patent application Ser. No. 15/396,471, entitled "METHODS AND APPARATUS FOR ADAPTIVE TIMING FOR ZERO VOLTAGE TRANSITION POWER CONVERTERS," filed contemporaneously with this application, naming Bandyopadhyay as inventor, which applications are also hereby incorporated by reference in their entirety herein.

TECHNICAL FIELD

This relates generally to electronics, and, in particular, to circuits for power conversion.

BACKGROUND

Switching power supplies date back several decades and are currently heavily utilized in the electronics industry. Switching power supplies are commonly found in many types of electronic equipment such as industrial machinery, automotive electronics, computers and servers, mobile consumer electronics (mobile phones, tablets, etc.), battery chargers for mobile electronics, and low cost/light weight items such as wireless headsets and key chain flashlights. Many applications include switching power supplies for portable, battery powered devices where an initial voltage is stepped down to a reduced voltage for supplying part of the device, such as integrated circuits that operate at fairly low voltage direct current (DC) levels. Switching supplies are popular because these power supplies can be made lightweight and at low cost. Switching supplies are highly efficient in the conversion of the voltage and current levels of electric power when compared to the prior approaches using non-switching power supplies, such as linear power supplies.

High efficiency is achieved in switching power supplies by using high speed, low loss switches such as MOSFET transistors to transfer energy from the input power source (a battery, for example) to the electronic equipment being powered (the load) only when needed, so as to maintain the voltage and current levels required by the load.

Switching power supplies that perform conversion from a DC input (such as a battery) that supplies electric energy within a specific voltage and current range to a different DC voltage and current range are known as "DC-DC" converters. Many modern DC-DC converters are able to achieve efficiencies near or above 90% by employing zero voltage transition (ZVT). The ZVT technique was developed by Hua, et. al. and is described in a paper published in 1994 ("Novel Zero-Voltage-Transition PWM Converters," G. Hua, C. -S. Leu, Y. Jiang, and F. C. Lee, IEEE Trans. Power Electron., Vol. 9, No. 2, pp. 213-219, Mar. 1994), which is hereby incorporated by reference in its entirety herein. The use of the ZVT function in DC-DC converters reduces energy loss that would otherwise occur due to switching losses. ZVT also has the additional benefit of reducing voltage stress on primary power switches of the DC-DC converters. Reduction in voltage stress on a switch allows the switch to have a lower voltage tolerance rating and, therefore, potentially the switch can be smaller and less costly.

The ZVT circuitry employed by prior DC-DC converters introduces additional switches and corresponding additional energy loss and voltage stress on switching elements. However, the impact of energy loss and voltage stress of the ZVT function is much less significant than the overall performance improvements to the switching converters that employ ZVT functionality. Further improvements to reduce energy loss and voltage stress of the ZVT function are still needed. These improvements will permit improvement of electronic equipment in increased battery life, lower cost of operation, lowered stress on devices, and improved thermal management.

SUMMARY

In described examples, an apparatus includes: a first switch having a control terminal, a first current handling terminal coupled to a voltage source, and having a second current handling terminal coupled to a switch node; a second switch having a control terminal, a first current handling terminal coupled to the switch node, and having second current handling terminal coupled to a voltage reference; a first inductor having one terminal coupled to the switch node and a second terminal coupled to a load terminal; a third switch having a control terminal, a first current handling terminal coupled to the voltage source and second current handling terminal coupled to an auxiliary node; a fourth switch having a control terminal, a first current handling terminal coupled to the auxiliary node and a second current handling terminal coupled to the voltage reference; and a second inductor having a first terminal coupled to switch node and a second terminal coupled to the auxiliary node. In addition, the apparatus includes a fifth switch having a control terminal, a first current handling terminal coupled to the switch node and the first terminal of the second inductor and a second current handling terminal coupled to the auxiliary node and the second terminal of the second inductor; and timing circuitry configured to output control signals to the control terminals of the first switch, the second switch, the third switch, the fourth switch and the fifth switch to supply current to the load terminal.

BRIEF DESCRIPTION OF THE DRAWINGS

FIG. 3 is a timing diagram of the sequence of switch transition events to operate ZVT functionality for an example embodiment.

FIG. 5 is a circuit diagram of an ideal equivalent circuit diagram of the ZVT resonant circuit.

FIG. 6 is a circuit diagram of an ideal equivalent circuit diagram of the ZVT resonant circuit in an alternative arrangement.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1:
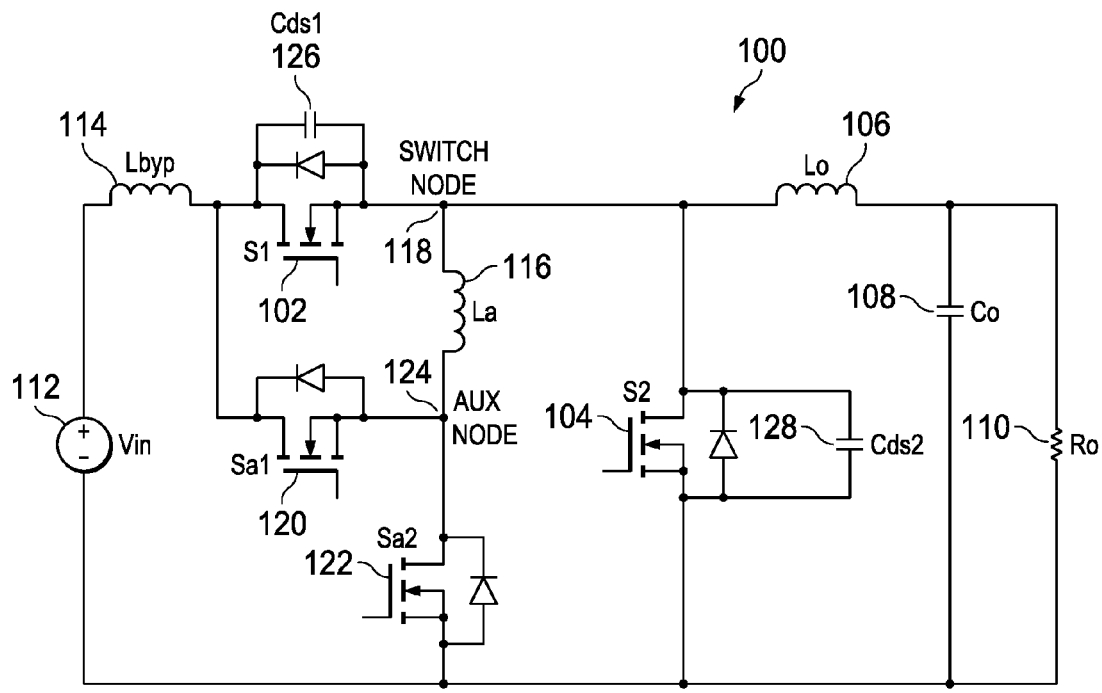
FIG. 1 is a circuit diagram illustrating a ZVT DC-DC buck power converter.

FIG. 1 illustrates a conventional ZVT DC-DC converter circuit 100 arranged in a buck converter circuit topology. Buck DC-DC converters provide an output voltage at a lower voltage than an input voltage. Other types of DC-DC converters that can benefit from the use of ZVT switching include, but are not limited to, boost converters that increase the output voltage to a voltage greater than the input voltage, and buck-boost DC-DC converters that dynamically transition between the buck and boost functions to adapt to various input voltage levels (having input voltages that could be either greater or less than the output voltage) to provide an output voltage to the load.

FIG. 1 illustrates in a simplified circuit diagram the switching elements, key passive components, and key parasitic elements of a ZVT DC-DC buck converter circuit 100. Omitted from FIG. 1 for simplicity of explanation are minor components, minor parasitic elements, the circuits for monitoring output voltage, and the control circuit for controlling the switch timing that are utilized in example ZVT DC-DC buck power converters.

In FIG. 1, circuit 100 includes two primary power switches, 102 (S1) and 104 (S2), that in conjunction with the output inductor 106 (Lo) and capacitor 108 (Co) perform the primary function of the buck converter. The buck converter circuit 100 supplies energy to the load (represented as a resistor 110 (Ro)) at an output voltage level Vo that is a reduced voltage from the DC input voltage supply 112 (Vin). Vin represents both the external element that is the source of input voltage (such as a battery or another power supply) to the ZVT power converter and the voltage level across the positive and negative terminals of the Vin input voltage source.

Auxiliary switches Sa1 and Sa2 and auxiliary inductor La are the components that are added to the previous conventional switching converter topology to accomplish the ZVT functionality. A primary parasitic inductance that contributes to voltage stress on switch S2 is represented in FIG. 1 by parasitic inductance 114 (Lbyp). The source terminal of transistor 102, the drain terminal of transistor 104 and one terminal of each auxiliary inductor 116 (La) and the output inductor 106 (Lo) are coupled as illustrated in FIG. 1 to a common switch node 118 (Switch Node). The first auxiliary switch 120 (Sa1), the second auxiliary switch 122 (Sa2), and the auxiliary inductor 116 are coupled together at auxiliary node 124 (Aux Node). All four switches in example circuit 100 of FIG. 1 (S1, S2, Sa1, and Sa2) are shown implemented as enhancement mode n-channel MOSFETs. Drain-to-source parasitic capacitances of switches S1 and S2 are important to the circuit description and are illustrated in FIG. 1 as capacitance 126 (Cds1) and capacitance 128 (Cds2), respectively. The intrinsic body diode of MOSFET switches is also shown coupled between source and drain for all switches (S1, S2, Sa1, and Sa2) of FIG. 1.

While enhancement mode n-channel MOSFETs are commonly used as switches in DC-DC converters as shown in the example in FIG. 1, other types of transistor switches as well as diode switches have been employed and can be used to form the circuit 100. The switches in FIG. 1 can also be used to form other types of switching power converters.

Circuit 100 supplies a reduced voltage to the load (the output voltage is across resistor 110 (Ro)) by alternatively switching between two primary states. In one of the primary states (defined by switch S1 closed and switch S2 open, which means switch S1 is a transistor that is turned on, while switch S2 is a transistor that is turned off), the input voltage source (Vin) supplies energy to the load, and energy to maintain or increase magnetic energy is also stored in inductor Lo. In the other primary state (defined by switch S1 open and switch S2 closed, which means that switch S1 is a transistor that is turned off, while switch S2 is a transistor that is turned on), current flow from the input voltage (Vin) is blocked. In this state, the magnetic energy previously stored in inductor Lo is converted to electric energy, and supplies energy to the load (resistor Ro). The output voltage across the load Ro is maintained in a pre-defined range by varying the relative amount of time the circuit spends in each of the primary states.

Converters that alternate between the two states described hereinabove are sometimes described as pulse width modulated (PWM) switching converters. This description is used because the output voltage Vo is proportional to the input voltage Vin, multiplied by the duty cycle of switch S1 (a ratio of the on time of switch S1 to the total cycle period). Typically, prior known buck converters cycle between these states (often at frequencies such as hundreds of kHz to 1 MHz and above). In addition to the two primary states, there are brief dead times during the transitions between the two primary states. During the dead times, switches S1 and S2 are simultaneously open, that is the transistors implementing switches S1 and S2 are simultaneously turned off. Dead times are used to insure there is not a high current path across the input voltage source (Vin) directly to ground, which could occur if both switches S1 and S2 are simultaneously closed. Conventional PWM switching power supplies employ two dead times during each cycle of operation: a first dead time occurs when switch S1 opens and ends when switch S2 closes; and a second dead time occurs when switch S2 opens and ends when switch S1 closes.

In a ZVT converter, such as circuit 100, the ZVT function begins prior to the beginning of the second dead time with S2 opening, and the ZVT function ends after the second dead time ends with switch S1 closing. The ZVT function does not operate in the first dead time of the buck converter cycle described above (the time between switch S1 opening and S2 closing).

Figure 2:
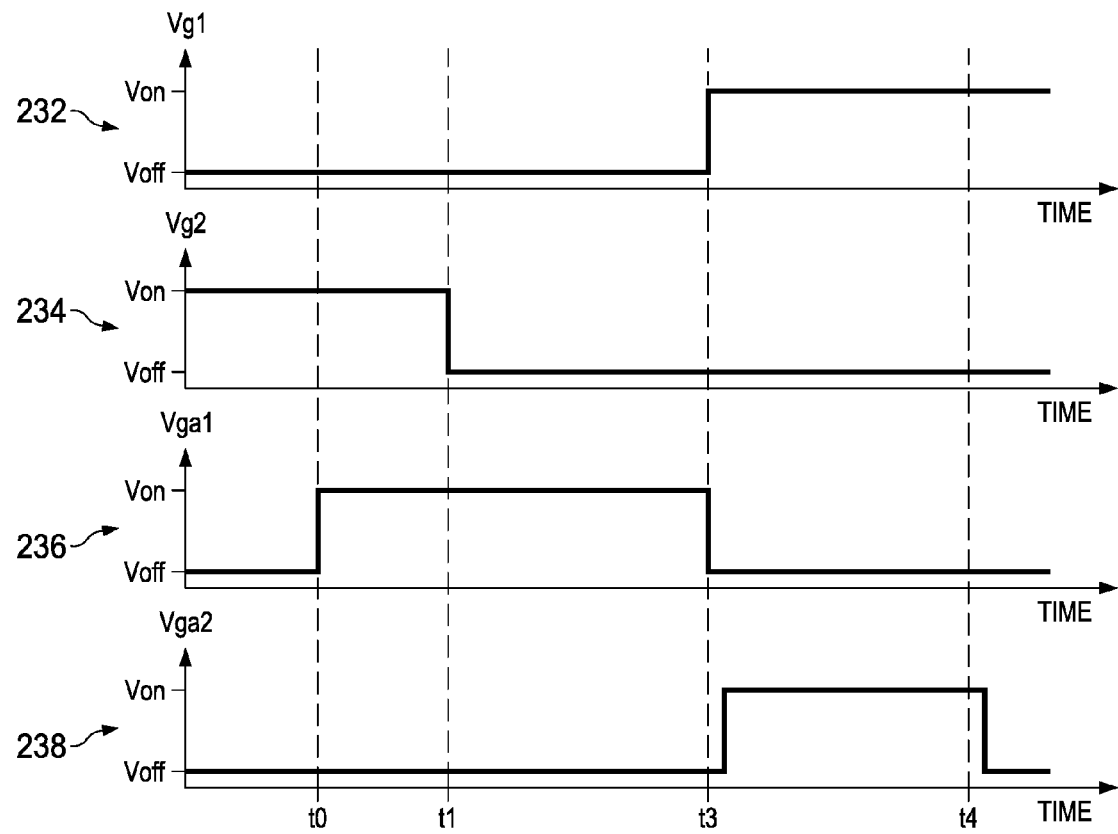
FIG. 2 is a timing diagram for a sequence of switch transition events to operate ZVT functionality.

FIG. 2 illustrates in a timing diagram the sequence of switch transition events used to operate ZVT functionality in the buck converter circuit 100. In FIG. 2, the switching events are labeled t0, t1, t3, and t4. (Note that there is no event labeled t2 in FIG. 2, for increasing simplicity of explanation when comparing the switching event sequence of the conventional ZVT DC-DC buck converters with the switching event sequences of example arrangements of the present application.) In FIG. 2, the dead time described hereinabove during the time interval between switch S2 opening and switch S1 closing begins at event t1 and ends at event t3.

The open and closed states of each of the four switches (primary S1, S2, and auxiliary switches Sa1, and Sa2) illustrated in FIG. 1 are represented in FIG. 2 by the voltage applied to the switch gates (Vg1, Vg2, Vga1, and Vga2 respectively) and shown in four graphs: 232; 234; 236; and 238. Graph 232 illustrates the voltage on the gate of switch S1, graph 234 illustrates the voltage on the gate of switch S2, graph 236 illustrates the voltage on the gate of switch Sa1, and graph 238 illustrates the voltage on the gate of switch Sa2. A voltage annotated as Von applied to a switch gate indicates the switch is closed (the corresponding transistor is on), and a voltage annotated as Voff indicates the switch is open (the corresponding transistor is off). FIG. 2 illustrates a sequence of switching events, and does not illustrate specific voltage levels, waveform shapes, and time increments.

ZVT functionality for prior known approaches begins at the event labeled t0 in FIG. 2 with switch Sa1 turning on, as shown in graph 236. In the time leading up to event t0 switch S2 has been closed, and switches S1 and Sa2 have been open for a significant portion of the current buck converter cycle. Time progresses from event t0 to event t1 illustrated in FIG. 2. At time t1, switch S2 opens as shown in graph 234. At the next event, t3, switches S1 and Sa2 close as shown in both graphs 232, 238. Switch Sa1 opens at time t3, as shown in graph 236, and after a short delay to provide a dead time, Sa2 closes just after event t3, as shown in graph 238. At event t4, Sa2 opens as shown in graph 238 to complete ZVT functionality for the current cycle of the buck converter.

The example conventional ZVT buck converter circuit 100 illustrated in FIG. 1 accomplishes ZVT when the primary power switch S1 transitions from open to closed (S1 turn on as shown in graph 232) at event labeled t3 illustrated in FIG. 2. Switch S1 turns on at t3 with zero or near zero volts across it. For the circuit 100 to reach a condition with zero or near zero volts across switch S1 prior to S1 turning on (or closing), an L-C resonant circuit is used. The L-C resonant circuit increases the voltage at the source terminal of switch S1 (coupled to the node "Switch Node" in FIG. 1) until the voltage is approximately equivalent to the voltage at the drain terminal of S1, which is coupled to and approximately equivalent to the input voltage, Vin. The L-C resonant circuit includes the auxiliary inductor La and the parallel combination of capacitances Cds1 and Cds2 (the drain to source parasitic capacitances of the switches S1 and S2 respectively) (see FIG. 1). This L-C resonant circuit is referenced herein as the "ZVT resonant circuit." The ZVT resonant circuit is a portion of circuit 100. In some approaches, the ZVT resonant circuit resonates only when switch Sa1 is closed and switches S1, S2, and Sa2 are open, which is during the time span between events t1 and t3 in FIG. 2. The time span between events t1 and t3 for some approaches is equivalent to one-quarter cycle of the resonant frequency of the ZVT resonant circuit.

While some conventional DC-DC converters incorporating the ZVT function typically have lower energy loss and lower voltage stress on the transistor switches when compared to DC-DC converters formed without the ZVT function, the ZVT function itself introduces additional energy loss and voltage stress.

There are two key contributors to energy loss of prior known ZVT functions that are reduced by use of the arrangements of the present application. First, energy is lost when auxiliary switch Sa1 turns off when conducting peak current, as it transitions through the MOSFET linear region. The second key contribution to energy loss during the ZVT operation is the sum of conduction losses through the auxiliary switches Sa1, Sa2, the primary switch S1, and inductor La.

The most significant impact of voltage stress resulting from the ZVT function is on the voltage tolerance required for switch S2. Voltage stress on switch S2 impacts S2 transistor size and potential cost. The voltage stress on switch S2 is the result of switch Sa1 turning off with peak current flowing through it, causing a voltage spike across switch S2 induced by the parasitic inductance 114 (Lbyp). In addition, there is a voltage spike across Sa1 when it turns off with current flowing through it, due to ringing with parasitic inductances. However, sizing Sa1 for higher voltage tolerance is not a significant impact to potential converter cost, since Sa1 is already a relatively small transistor when compared to the primary power transistors, S1 and S2.

As discussed above, FIG. 1 illustrates in a simplified circuit diagram the switching elements, key passive components, and key parasitic elements of a ZVT DC-DC buck power converter. For the purposes of simplification, minor components, minor parasitic elements, and the circuits for monitoring output voltage and controlling the switch timing that are present in prior approaches and example arrangements of the present application are omitted from FIG. 1. In one characteristic of the embodiments, the sequencing and timing of transitions for the switches depicted in circuit 100 are improved to reduce stress and increase efficiencies. Consequently, circuit 100 is used herein for explanation of the switching events of a ZVT DC-DC buck power converter as well as for the illustration of the embodiments.

In the various embodiments, the switch transition sequencing and timing employed results in improved power efficiency. Use of the arrangements also enables improved ZVT power converters with reduced semiconductor die area for switch implementation.

The switch transition sequencing and timing employed in the embodiments occurs during the operation of the ZVT function, and does not significantly impact the operation of circuit 100 during the remainder of the power supply cycle. Consequently, a description of the full power supply cycle is not included.

FIG. 3 illustrates in a timing diagram the sequence of switch transition events to operate ZVT functionality for an example arrangement of the '750 Application. This explanation is presented for illustration, however the embodiment methods can also be applied to other ZVT timing arrangements. In FIG. 3, the switching events are labeled t0, t1, t2, t3, and t4.

The open and closed states of each of the four switches (S1, S2, Sa1, and Sa2) illustrated in FIG. 1 are represented in FIG. 3 by the voltage applied to the switch gates (Vg1, Vg2, Vga1, and Vga2 respectively). Graph 332 illustrates the voltage Vg1 at the gate terminal of switch S1. Graph 334 illustrates the voltage Vg2 at the gate terminal of switch S2. Graph 336 illustrates the voltage at the gate terminal of the switch Sa1. Graph 338 illustrates the voltage at the gate terminal of switch Sa2. A voltage annotated as Von applied to a switch gate indicates that the switch is closed because a transistor is on, and a voltage annotated as Voff indicates the switch is open because a transistor is off. Graphs 332, 334, 336 and 338 in FIG. 3 illustrate the sequence of switching events. FIG. 3 does not illustrate specific voltage levels, waveform shapes, and time increments. For both the various embodiments and for other ZVT approaches there is a brief dead time between switch Sa1 turn off and switch Sa2 turn on. This dead time is used to insure there is not a high current path across the input voltage source, Vin. The dead time between switch Sa1 turn off and switch Sa2 turn on does not significantly impact circuit 100 functionality. Consequently, switch Sa1 turn off, the intervening dead time, and switch Sa2 turn on are illustrated as occurring in a single event (at time t2) in FIG. 3 for further simplicity of explanation.

ZVT functionality for the example arrangements of the '750 Application begins with the event labeled t0 in FIG. 3, with switch Sa1 turning on, as shown in graph 336, while switch S2 remains closed (on) and switches S1 and Sa2 remain open. In FIG. 3, time progresses to event t1. At event t1, switch S2 opens as shown in graph 334. At the next event, t2, as shown in FIG. 3, switch Sa1 opens as illustrated in graph 336, and after a short delay that fulfills the dead time requirement, switch Sa2 closes as shown in graph 338. (In sharp contrast, in prior approaches, the ZVT circuits do not employ a switching event at time t2, as previously stated.) As shown in FIG. 3, at event t3 for the arrangements of the present application, switch S1 is closing as is illustrated in graph 332. At event t4, switch Sa2 opens as shown in graph 338 to complete ZVT functionality for the current cycle of the buck converter.

Additionally, the waveform and timing diagrams provided herein are not annotated with voltage and current values and time increments, since specific values depend on a how a specific example arrangement is implemented. When waveforms are compared herein, the same relative voltage, current, and time scales are used.

For each successive span of time between the above stated switching events, a description of the ZVT functionality and the switch transition sequencing and timing employed by the embodiments within the respective time span follows, as well as a comparison of the present arrangement of the embodiments to prior approaches. In addition, a description of the circuit functionality to control the switch sequencing and timing of the arrangements of the present application is provided hereinbelow.

The first time span during the operation of the ZVT function is between events t0 and t1 as shown in FIG. 3. The ZVT function starts during each buck converter cycle at event t0. In the time leading up to t0, the ZVT function begins in a state with switch S1 open and switch S2 closed, and switches Sa1 and Sa2 are open. At event t0, switch Sa1 closes, allowing current to flow through the auxiliary inductor La, which ramps from zero amperes until the current flowing in inductor La is approximately equivalent to the current flowing through inductor Lo. Simultaneously, the current flowing in the closed switch S2 ramps to zero or near zero. The behavior of circuit 100 for both the embodiments herein and for the other ZVT approaches is similar for the time interval starting at event t0 and ending at event t1, except that the time at which event t1 occurs after event t0 is adjusted by the control circuit of the embodiments of the present application. The adjustments are further described hereinbelow.

The adjustment to the time at which event t1 occurs can be performed in order to modify the resonant trajectory of the ZVT resonant circuit, such that the switch node voltage will be equal or nearly equal to the input voltage, Vin, at event t3 (ZVT functionality for subsequent events is described below). Adjusting the resonant trajectory on an on-going basis allows the ZVT function to adapt to dynamic changes in the load and for other operating conditions. The adjustment to the time at which t1 (following the events at t0) occurs is accomplished in the embodiments indirectly by monitoring and adjusting the current Is2 flowing through switch S2 when it is turned off at event t1. To accomplish the adjustment of the S2 turn off current, the switch node voltage is measured at event t3. If the switch node voltage is equal to or greater than Vin at time t3, the target value (the current through S2 when S2 turned off, or IS2-off) for the S2 turn off current is incrementally reduced. If the switch node voltage is less than Vin at time t3, Is2-off is incrementally increased. During the operation of the ZVT function of the immediately following buck converter cycle, the current in switch S2 is monitored between events t0 and t1 and is compared to Is2-off (set in the previous cycle). In the arrangements, the switch S2 is turned off when the current Is2 is equal to or less than Is2-off.

The second time span during the operation of the ZVT function as shown in FIG. 3 is between events t1 and t2. For both the embodiments and for other ZVT approaches, switch S2 opens at event t1 with zero or near zero current flowing through it, as shown in graph 334. Switches S1 and Sa2 remain open at t1. With only switch Sa1 closed, the inductor La resonates with the parallel combination of the parasitic drain to source capacitances, Cds1 and Cds2, of switches S1 and S2, respectively (the ZVT resonant circuit). In example embodiments, event t2 occurs at a time that is ⅙ tr after event t1 (where "tr" is the resonant period of the ZVT resonant circuit). At ⅙ tr, the switch node reaches a voltage greater than ½ Vin. At time t2, Sa1 is opened and Sa2 is closed (after a short dead time delay between opening Sa1 and closing Sa2) as shown in FIG. 3 in graphs 336, 338.

Figure 4:
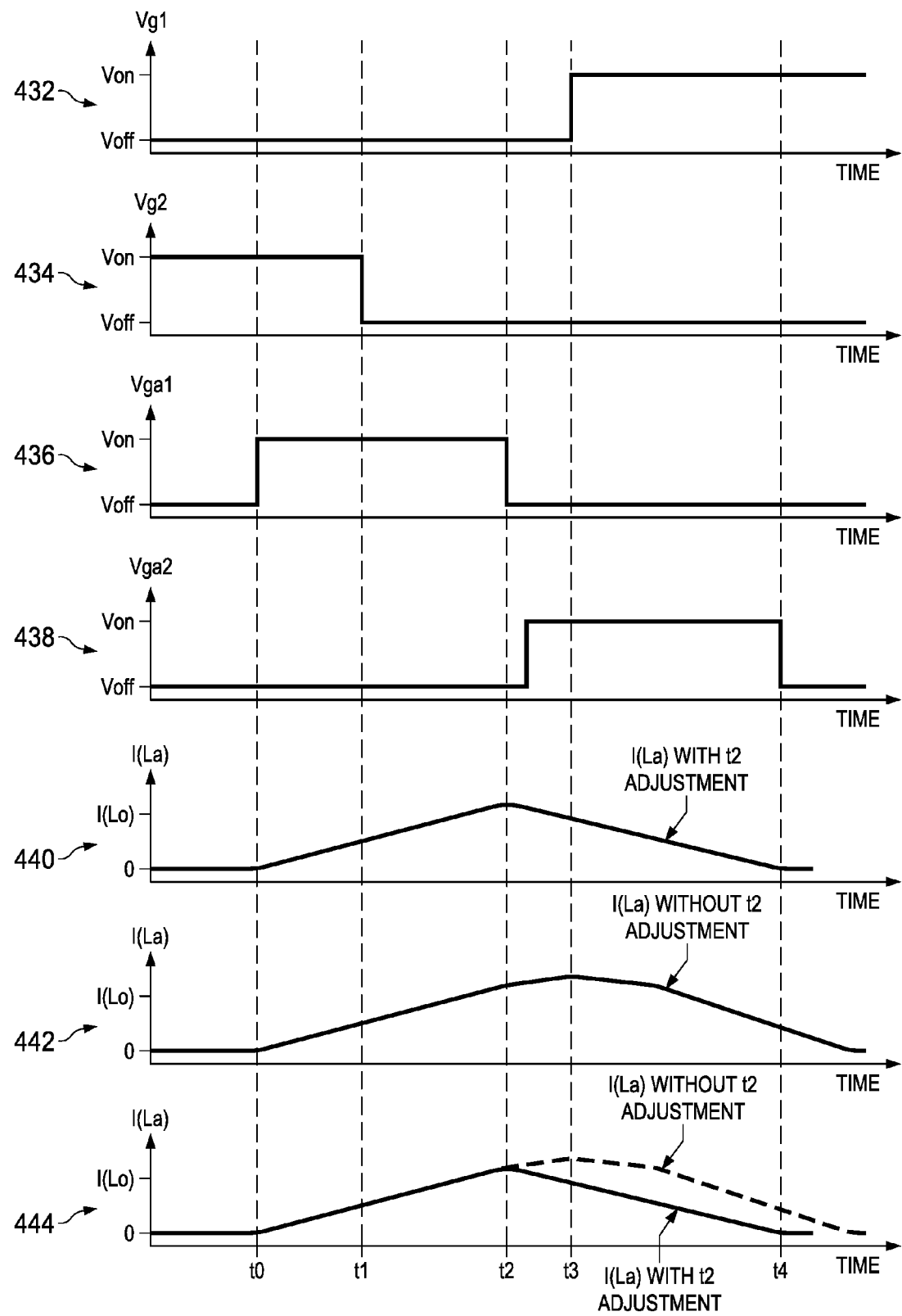
FIG. 4 is a group of waveform plots related to the timing diagrams of FIG. 3.

FIG. 4 illustrates in graphs 440, 442 and 444 the current in auxiliary inductor 116 (La, FIG. 1), labeled I(La), for the example arrangements of the '750 Application and also presents graphs comparing the current obtained to the corresponding current obtained in other approaches for conventional ZVT converters. The switching events t0, t1, t2, t3, and t4 shown in FIG. 4 are duplicated from FIG. 3 in graphs 432, 434, 436 and 438, respectively, for clarity of illustration. The time scales of FIG. 4 for I(La) waveforms are the same for both the arrangements of the present application and the prior approaches illustrated for comparison.

Graphs 432, 434, 436, and 438 of FIG. 4 correspond to the graphs 332, 334, 336 and 338 in FIG. 3, respectively, and depict the gate voltages on the switches S1, S2, Sa1, and Sa2, respectively, for circuit 100 in FIG. 1. In FIG. 4 an example sequencing arrangement of the '750 Application is illustrated at the events t0, t1, t2, t3 and t4.

In FIG. 4, the current flowing in the inductor La (labeled 116 in FIG. 1) is shown on separate graphs 440 for I(La) with the event time t2 adjustment and 442 for I(La) without t2 adjustment, as well as graph 444 which combines both the arrangements on the same set of axes. Graph 444 is presented to illustrate that arrangements with t2 adjustment operate at lower inductor La current for a shorter time period during the time span between events t2 and t4. For the overlaid waveform diagram in graph 444, a dashed line is used to illustrate current I(La) without t2 adjustment to show where the waveforms differ significantly. In graphs 440, 442 and 444 of FIG. 4, the current through Lo is represented by fixed grid line labeled I(Lo). In practice, I(Lo) is not a fixed value and is load dependent. For simplicity of explanation, I(Lo) is shown as a fixed value.

An additional difference between approaches that do or do not adjust t2 is that in the arrangements where t2 is adjusted, a voltage spike occurs when switch Sa1 opens at event t2 with current flowing through it, due to ringing with parasitic inductances. In other ZVT buck converters where times t2 and t3 coincide, this voltage spike appears only across switch S2, since it is open and switch S1 is closed when the spike occurs. In contrast, in the arrangements where t2 is adjusted, the arrangements operate by opening switch Sa1 with both S1 and S2 open and before the drain to source capacitance of S1 (Cds1) is fully discharged, distributing the voltage spike across both switches S1 and S2 in series. Specifically, in the approach where t2 is adjusted, the series combination of the parasitic drain-source capacitances Cds1 and Cds1 of switches S1 and S2 respectively form a capacitive divider across which the voltage spike occurs. Dividing the voltage spike across both S1 and S2 reduces the voltage tolerance requirement of switch S2 (when compared to the voltage tolerance requirement for the same switch in other approaches). The voltage tolerance requirement of the switch S1 is not increased with t2 adjustment, because the spike across S1 that occurs when Sa1 opens in the example arrangements is less than the voltage across S1 at other times during the operation of the buck converter.

The third time span during the operation of the ZVT function for the approach with t2 adjustment is between events t2 and t3. As stated hereinabove, in the description of FIG. 3, event t2 for the arrangements of the '750 Application occurs when the transition of switch Sa1 from closed to open occurs, and switch Sa2 transitions from open to closed shortly afterwards, with switches S1 and S2 remaining open. When switch Sa1 opens and switch Sa2 closes, the ZVT resonant circuit configuration is changed and the voltage across inductor La reverses. Current flow through inductor La will continue in the same direction, and resonance will continue on a different trajectory with the current in La resonating towards zero, resulting in the switch node continuing to charge. The energy stored in La at event t2 continues charging the switch node until it becomes approximately equivalent to the input voltage Vin, provided the event at time t2 occurs with the switch node voltage still sufficiently above ½ the Vin voltage level. It should be noted that for an ideal circuit, if t2 were to occur when the switch node is exactly ½ Vin, then the energy stored in inductor La will charge the switch node voltage to Vin. However, in the example arrangements, t2 should occur with the switch node at a voltage greater than ½ Vin so as to accommodate component parameter variance and non-ideal circuit characteristics. The switch node voltage becomes approximately equivalent to Vin at a time that is $\frac{1}{12}$ tr after the event t2, at which time event t3 occurs, with S1 closing. This sequence is shown in graphs 432, 434, 436, and 438 at time t3.

FIG. 5 illustrates in a simplified circuit diagram an equivalent ideal ZVT resonant circuit 500 for the example configuration operating during the span of time from event t1 to t2 described hereinabove. FIG. 6 illustrates in another simplified circuit diagram the equivalent ideal ZVT resonant circuit 600 for the example configuration for the span of time from event t2 to t3 described hereinabove. Both equivalent circuits 500 and 600 illustrate a portion of circuit 100 of FIG. 1 with switches S1, S2, Sa1, and Sa2 in the states described hereinabove for the respective time spans. For simplicity, in the diagrams for circuits 500 and 600, the switches Sa1 and Sa2 are treated as ideal and shown as interconnect conductors when closed, and are simply not shown when open.

As described hereinabove, during the time period between events t2 and t3 for various embodiments, stored energy in inductor La is used to charge the switch node from a level greater than ½ Vin to Vin. In sharp contrast to the present arrangements, for ZVT converters using other approaches, the converters utilize energy from the power converter input voltage source, Vin, to charge the switch node to be approximately equivalent to the input voltage, Vin. Consequently, more energy is stored in La and current is higher in La when switch S1 closes at t3 during operation of prior approaches (than for the arrangements of the present application). Greater stored energy in La and higher current through La result in greater energy losses for the other approaches.

As stated hereinabove, the event t2 of the embodiments is not part of the operation of other approach converters. Therefore, other approach ZVT resonant circuits continue resonance on the same trajectory for the full time span from t1 to t3. In contrast, for the example arrangements herein described, the resonant trajectory is modified at event t2 as described hereinabove.

As illustrated in FIG. 4, compared to other approaches, current through switch Sa1 is lower when Sa1 turns off during operation of example arrangements of the '750 Application. The current through Sa1 is lower due to ramping the switch node voltage to a level greater than ½ Vin. The turn-off of switch Sa1 is performed early (when compared to the other approaches), as opposed to waiting for the switch node voltage to be approximately equivalent to Vin. As a result, energy lost by switch Sa1 while it is conducting in the transistor linear region (during the transition from on to off) is much lower for arrangements of the present application.

The fourth and final time span during the operation of the ZVT function is between events t3 and t4. During the period of time between events t3 and t4, switch S1 turns on at event t3, and the current in inductor La ramps down to zero, at which time Sa2 is turned off at event t4, ending the operation of the ZVT function for the current buck converter cycle. After switch S1 closes, the portion of the current in stored in inductor La that exceeds the current in Lo is returned to the source and the remainder of the current in La flows into Lo to supply the load.

There are at least three differences between the operations of other approaches and the operation of the arrangements of the '750 Application in the time period between events t3 and t4. The first difference is that switch Sa1 opens and switch Sa2 closes at t3 in other approaches. For the approaches of the '750 Application, Sa1 opens and Sa2 closes prior to the event t3 (at t2) as described hereinabove. The second difference is that a smaller fraction of the energy stored in inductor La is returned to the source (when compared to the other approaches), thus reducing energy losses. The third difference is that for the other approaches, the inductor La current reaches its peak at t3. Instead, for the approach of the '750 Application, the peak current through La is lower and the peak current is achieved earlier in time (at event t2), resulting in the time period from t3 to t4 being significantly shorter for the described arrangements. Additionally, the time from t2 to t4 for the described arrangements is shorter than the time from t3 to t4 for other approaches.

The operation of example arrangements of the '750 Application described hereinabove results in switches Sa1, Sa2, and S1 and inductor La each conducting current for shorter amounts of time (when compared to the other approaches) with lower RMS current levels, resulting in significantly lower energy loss. The benefits that can accrue by use of these arrangements include: RMS current through Sa1, Sa2, S1, and La are lowered, since Sa1 turns off prior to the switch node voltage reaching Vin, resulting in lower peak current in La, Sa1, and Sa2; conduction time for switch Sa1 is reduced, since it turns off earlier than in prior approaches, turning off prior to the switch node voltage reaching Vin; and, since the peak current in La is lower for the arrangements described hereinabove, the current in La ramps to zero in less time, resulting in lower RMS current in switch S1. In addition, since the current in La ramps to zero more rapidly, the conduction times for switch Sa2, switch S1, and inductor La are also reduced.

While solving significant issues for the operation of the buck converter, the ZVT configuration creates additional issues. For example, when switch 102 (FIG. 1) turns off with narrow pulse widths, the body diode of switch 120 may keep the auxiliary switch node 124 clamped to Vin due to small negative currents through auxiliary inductor 116. Negative currents flowing through auxiliary inductor 116 means there are currents flowing into the auxiliary node, or flowing away from the switch node. The reverse current arises from reverse recovery and/or drain to source capacitance of switch 122. Fast turn-off of switch 102, which is preferred for high efficiency, causes oscillatory ringing at Vin due to parasitic inductances in the power loop. Because auxiliary switch node 124 is clamped to Vin by the body diode of switch 120, switch 122 must handle the increased voltage stress due to the ringing. This requires a larger and less efficient switch 122, which increases cost and circuit area.

Figure 7:
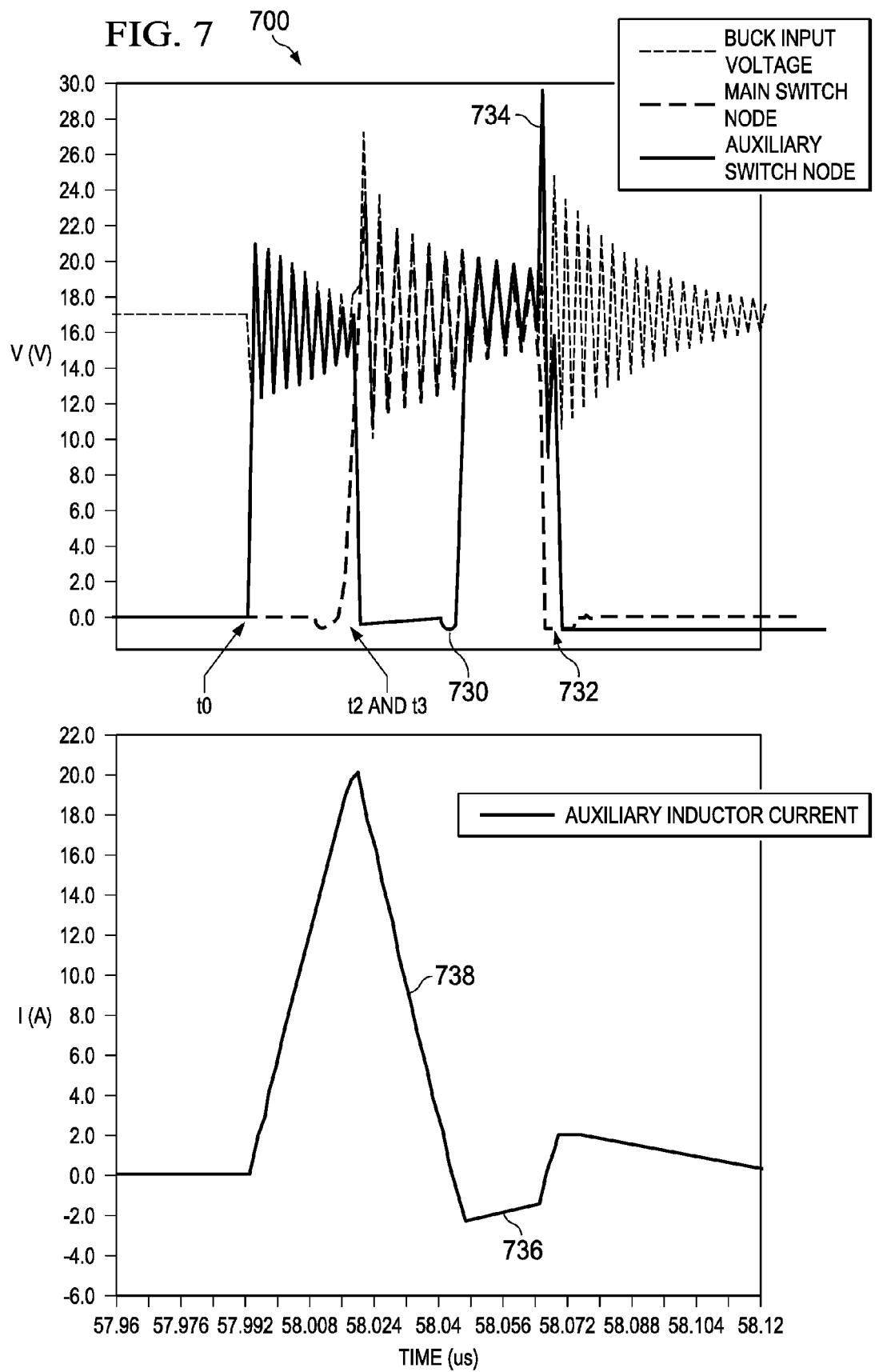
FIG. 7 is a simulation plot showing the effect when the body diode of the high side auxiliary switch clamps the auxiliary switch node.

FIG. 7 is a simulation trace 700 showing the effect where the body diode of switch 120 clamps the auxiliary switch node 124 to Vin. At time $t_0$ (FIG. 3), switch 120 turns on and pulls the auxiliary switch node 124 to Vin. At time t2, switch 120 turns off and at time $t_3$ switch 102 turns on. The current through auxiliary inductor 116 falls at this time as shown by the downward slope of trace 738. However, the current through auxiliary inductor 116 can overshoot due to the reverse recovery of switch 112 and/or energy stored in auxiliary inductor 116 and the parasitic capacitance of switch 122. This can cause a negative current 736. The body diode of switch 120 will be forward biased at a time just after time 730 until time 732, thus clamping auxiliary switch node 124 to Vin. This causes the auxiliary switch node to have a voltage spike 734 at time 732, when switch 102 turns off, causing stress on switch 122.

Figure 8:
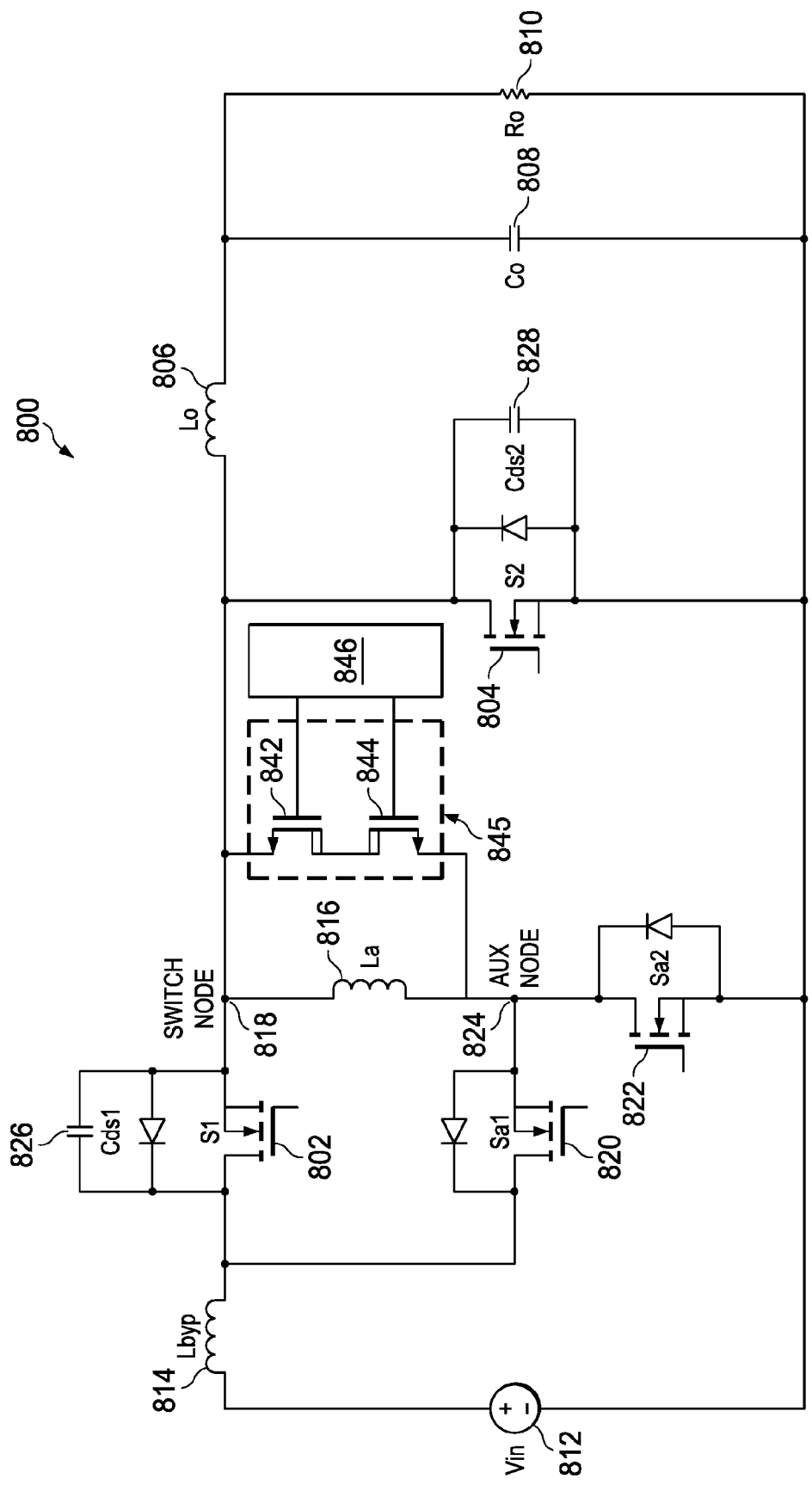
FIG. 8 is a circuit diagram for an embodiment.

FIG. 8 is a circuit diagram illustrating an embodiment. It is noted that although the embodiment circuits and timing described herein can be used in conjunction with the ZVT arrangements of the '750 Application, the circuitry and methods of the embodiments can also be incorporated with and used with other ZVT timing circuitry, and are not limited to the examples described herein.

Similarly labeled elements of FIG. 8 perform similar functions to those of FIG. 1. That is, elements 802, 804, 806, 808, 810, 812, 814, 816, 818, 820, 822, 824, 826, and 828 perform similar functions to elements 102, 104, 106, 108, 110, 112, 114, 116, 118, 120, 122, 124, 126, and 128, respectively, in FIG. 1. Transistors 842 and 844 form a bi-directional switch 845 that is used to connect auxiliary switch node 824 and main switch node 818 together as the switch 802 turns off (corresponding to time 732 in FIG. 7).

Transistors 842 and 844 are coupled in a bidirectional format to avoid a shorting current across auxiliary inductor 816 caused by body diode forward biasing. The voltages across auxiliary inductor 816 can be more positive at different times during the operation of circuit 800 at either the switch node 818 or at the auxiliary switch node 824. Therefore, a single transistor could have its body diode forward biased at some point, thus interfering with the operation of circuit 800. To avoid the problems that can be caused by forward biased body diodes, transistors 842 and 844 are in a bidirectional configuration so that one of the body diodes of transistors 842 and 844 are reverse biased at all times. In an example embodiment, transistors 842 and 844 are LDMOS transistors. In alternative embodiments, other transistor types can be used for 842, 844, depending on the transistor types used for power devices 802, 820, 822 and 804. In an embodiment, all of these transistors can be LDMOS transistors. Transistors 842 and 844 are controlled by control circuit 846. The operation of control circuit 846 is explained hereinbelow with regard to FIG. 9. Bidirectional switch 845 takes the current away from the body diode of switch 820 and is circulated in the loop formed by auxiliary inductor 816 (La) and bidirectional switch 845 across it. This effectively turns off the body diode of switch 820 and reduces the ringing across switch 822 when switch 802 is turned off.

Figure 9:
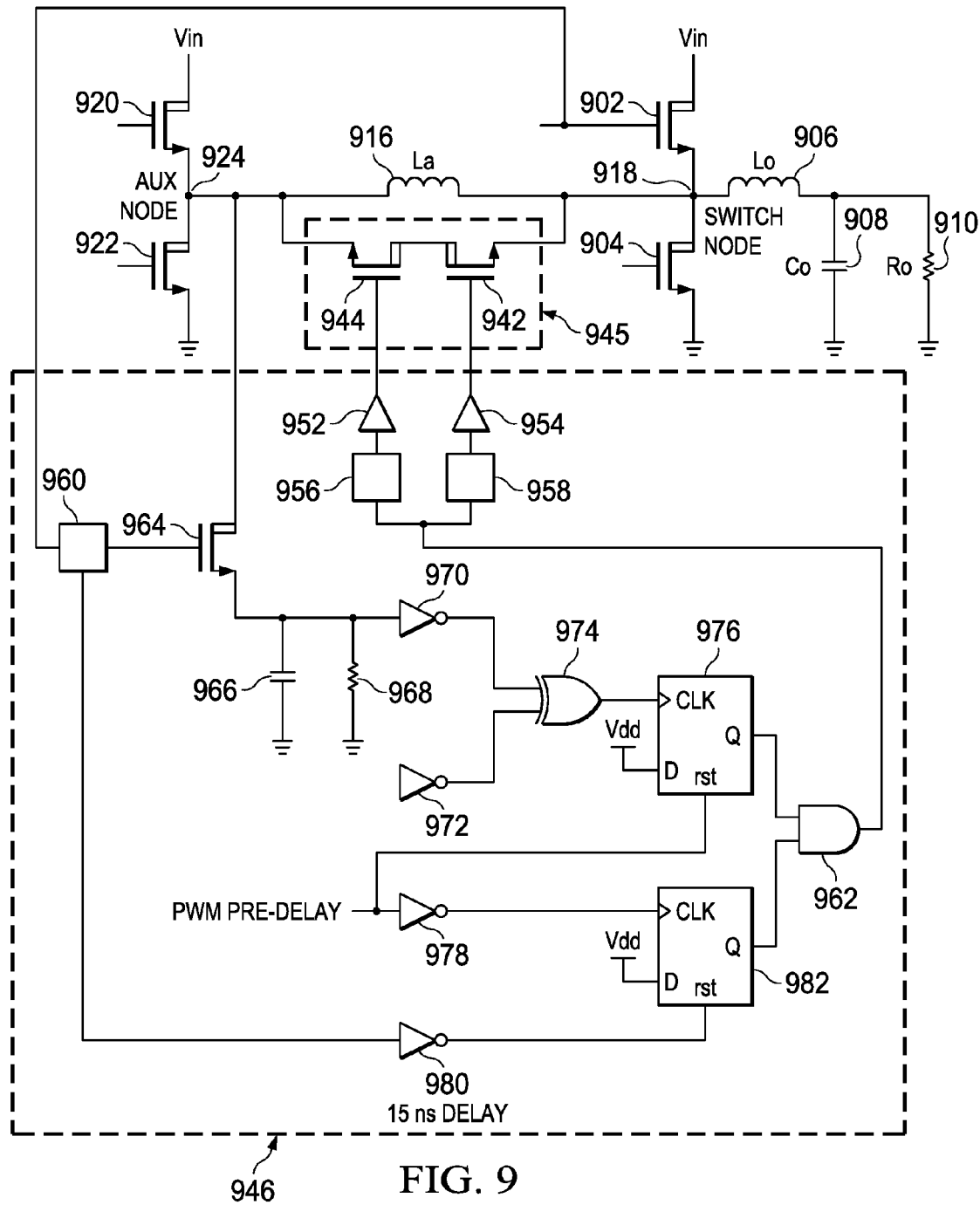
FIG. 9 is a diagram showing another circuit embodiment including the control circuitry for a bidirectional switch of FIG. 8.

FIG. 9 is a diagram showing an example embodiment for implementing the control circuitry for the bidirectional switch 845 in FIG. 8. Similarly labeled elements of FIG. 9 perform similar functions to those of FIG. 8. That is, switches 902, 904, 920 and 922, switch node 918, auxiliary switch node 924, bidirectional switch 945 (including transistors 942 and 944), along with inductors 916 and 906, load capacitor 908, load resistance 910 and control circuit 946 perform similar functions to switches 802, 804, 820 and 822, switch node 818, auxiliary switch node 824, bidirectional switch 845 (including transistors 842 and 844), along with inductors 816 and 806, load capacitor 808, load resistance 810 and control circuit 846, respectively, in FIG. 8. Both of transistors 942 and 944 are driven by the output signal of AND gate 962 via level shifters 956 and 958 and drivers 952 and 954.

In an example embodiment, transistor 964 is a drain-extended NMOS transistor in a source follower configuration. The drain of transistor 964 is coupled to auxiliary switch node 924. Level shifter 960 provides the controlling signal for switch 902 (see 332 in FIG. 3) to the gate of transistor 964. When switch 902 is on switch 920 is off (see FIG. 3). Therefore, when the gate control of switch 902 and auxiliary node 924 are both high, it indicates that the body diode of transistor 920 is conducting and thus connecting the auxiliary node 924 to Vin. These signals will turn transistor 964 on and cause a high signal across resistor 966. Because the signal on auxiliary node 924 is caused by ringing, capacitor 968 is used to smooth the signal on the source of transistor 964, which is coupled to inverter 970. The control signal for switch 902 is also coupled to inverter 972. The output of inverters 970 and 972 are coupled to NOR gate 974. Therefore, when high signals are detected on both the control signal for switch 902 and auxiliary node 924, both inverters 970 and 972 provide a low signal, and thus NOR gate 974 provides high signal to the CLK input of D flip-flop 976.

The D input of D flip-flop 976 is coupled to Vdd. Accordingly, when the CLK input signal is high and the reset signal is low, a high signal will be latched on the output Q. The reset input of D flip-flop 976 is couple to a PWM Pre-delay signal. This signal follows the control signal of switch 902, but transitions, for example, 5 ns before the transition of the control signal of switch 902. Therefore, if the output of NOR gate 974 is high (i.e., a high auxiliary node 924 voltage is detected), then, when the PWM Pre-delay signal goes low 5 ns before the control signal on the gate of switch 902 goes low, the Q output of D flip-flop 976 will go high 5 ns before time 732 (FIG. 7). This signal will not go low again until PWM Pre-delay returns to a high signal.

PWM Pre-delay is also coupled to inverter 978, which is coupled to the CLK input of D flip-flop 982. Thus, when the PWM Pre-delay signal goes low 5 ns before the control signal on the gate of switch 902 goes low, the output of inverter 978 provides a high signal to the CLK input of D flip-flop 982. The control signal of switch 902 is also coupled to the input of delay inverter 980. When the output of inverter 980 is high, D flip-flop 982 is reset to a low Q output. With the delay of inverter 980, inverter 980 resets D flip-flop 982, for example, 15 ns after the control signal of switch 902 transitions from a high signal to a low signal. Thus, D flip-flop provides a high output on output Q starting 5 ns before time 732 (FIG. 7) until 15 ns after time 732. The output of D flip-flops 976 and 982 are coupled to AND gate 962. Thus, when a high auxiliary node 924 voltage is detected, as indicated by a high output of D flip-flop 976, within the time period of 5 ns before and 15 ns, as indicated by a high output of D flip-flop 982, AND gate provides a high signal to level shifters 956 and 958, thus turning on transistors 942 and 944. This shunts away the negative current from auxiliary inductor 916 caused by resonance.

Figure 10:
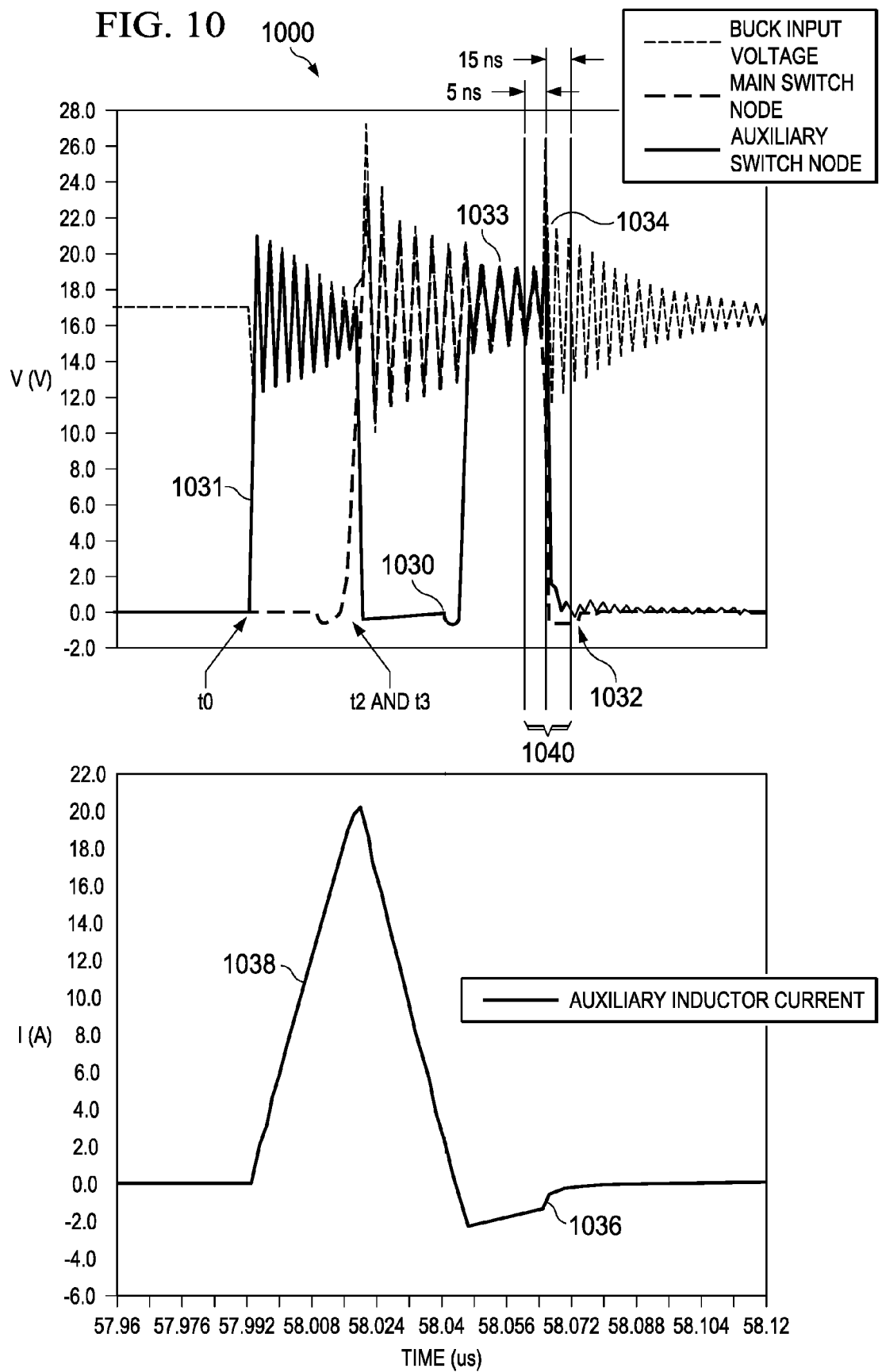
FIG. 10 is a simulation plot showing the operation of the embodiment circuit of FIG. 8.

FIG. 10 is a simulation trace of the operation of the circuit of FIG. 9. Trace 1031 is the voltage on auxiliary node 924 (FIG. 9). Trace 1038 is the current through auxiliary inductor 916 (FIG. 9). At time 1030, trace 1038 shows the negative current 1036 through inductor 916. During period 1040, which is the period from 5 ns before to 15 ns after the turn off of switch 902 (FIG. 9) at time 1032, bidirectional switch 945 is on. This allows the auxiliary node voltage to closely follow the switch node voltage. Therefore, unlike peak 734 (see FIG. 7), the voltage on auxiliary node 924 (see FIG. 9) only has a small peak 1034 when switch 902 (FIG. 9) turns off and the stress on switch 922 is therefore lessened. Avoiding this stress allows for switch 922 to be made smaller and more efficient.

Figure 11:
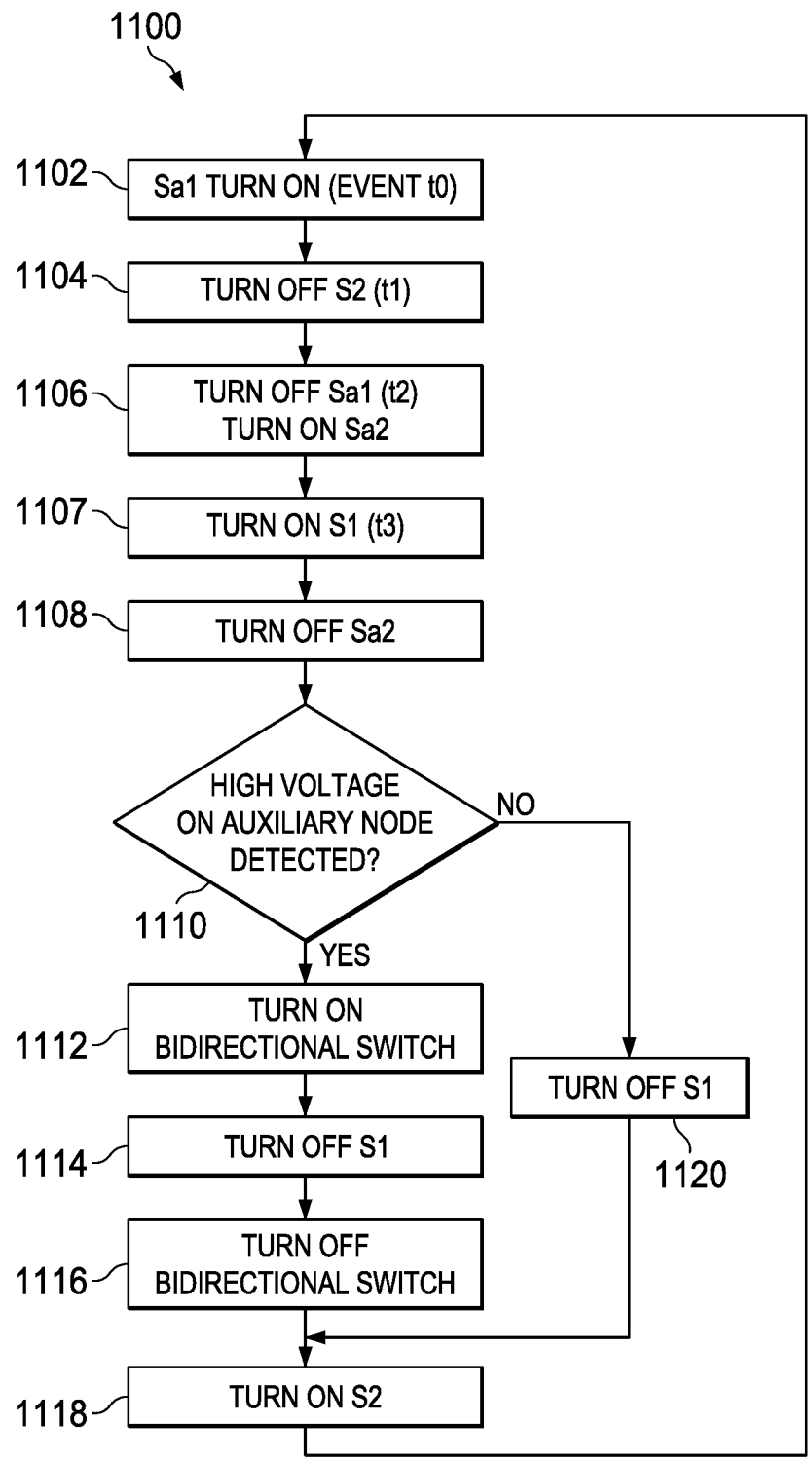
FIG. 11 is a flow chart showing a method embodiment.

FIG. 11 is a flow chart 1100 for a method embodiment showing the operation of circuit 800 with regard to detecting a high voltage on the auxiliary node 824 caused by forward bias on switch 802. At step 1102 the process begins with turning on switch Sa1 (820 in FIG. 8) while S2 is on. Step 1104 turns off S2 at time t1 (804 in FIG. 8). Step 1106 turns off Sa1 (820 in FIG. 8) and, after a small delay, turns on Sa2 (822 in FIG. 8), which occurs at t2. Step 1107 turns on S1 (802 in FIG. 8) at t3. Step 1108 turns off Sa2. At this point, the body diode of Sa2 may be forward biased. Step 1110 determines if the auxiliary node has a high voltage at this time. If not, step 1120 turns off S1. After a delay (as discussed hereinabove), the method continues at step 1118 and turns on S2 and the process returns to step 1102. If a high voltage on the auxiliary node is detected in step 1110, the method transitions to step 1112 and turns on the bidirectional switch (845 in FIG. 8) before step 1114 turns off S1. After step 1114, step 1116 turns off the bidirectional switch. After a delay, step 1118 turns on S2 and the process returns to step 1102.

Figure 12:
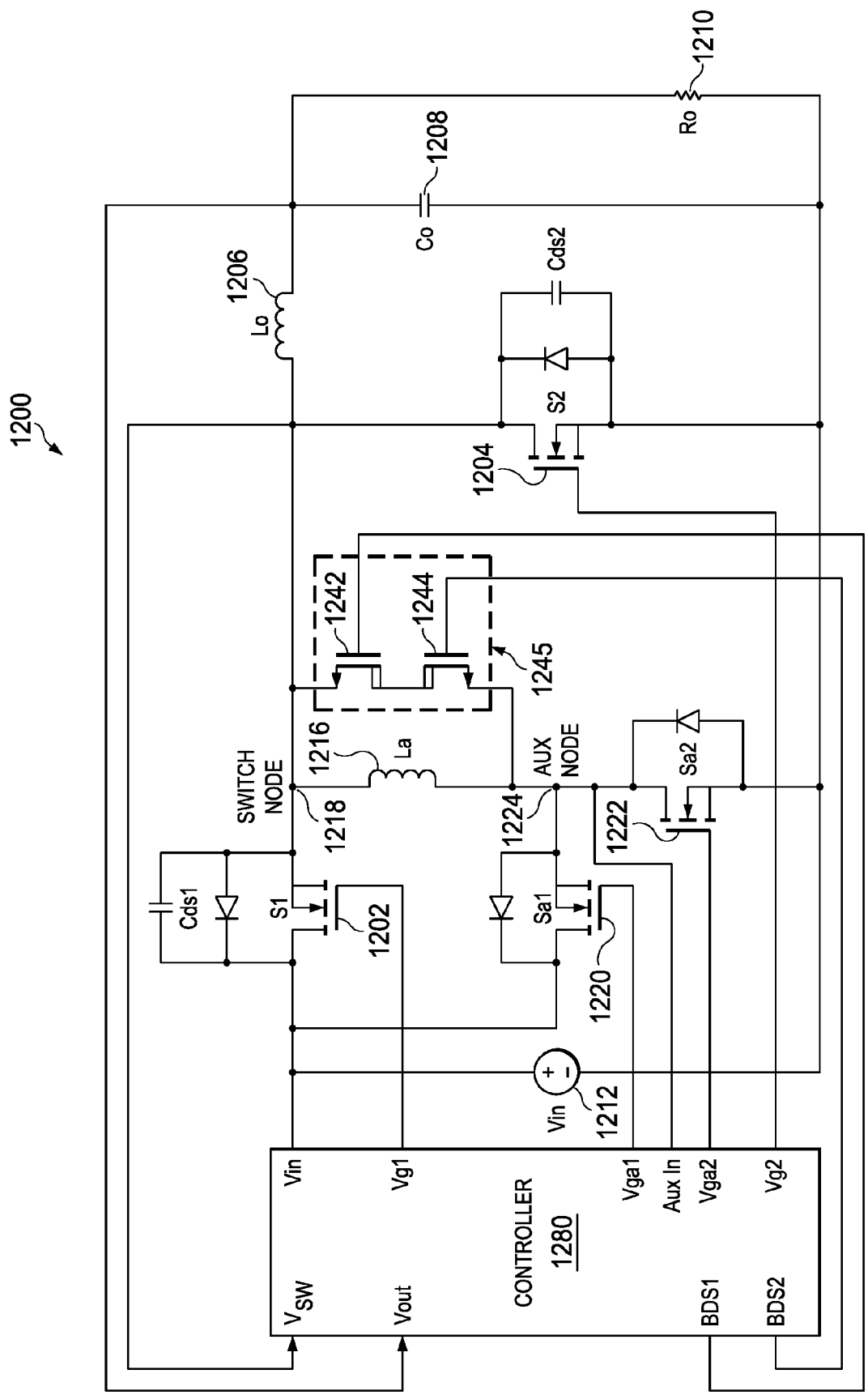
FIG. 12 is a circuit diagram of another embodiment using a controller to provide timing circuitry.

FIG. 12 is a circuit diagram for another embodiment. In FIG. 12, a controller 1280 provides the timing circuitry switch control outputs to provide gate control voltages Vg1, Vg2 to the primary switches S1, S2, the gate control voltages Vga1, Vga2, to the auxiliary switches Sa1, Sa2, and to the bi-directional switches 1244 (BDS1) and 1242 (BDS2). Similarly labeled elements of FIG. 12 perform similar functions to those of FIG. 8. That is, switches 1202, 1204, 1220 and 1222, switch node 1218, auxiliary switch node 1224, bidirectional switch 1245 (including transistors 1242 and 1244), along with inductors 1216 and 1206, load capacitor 1208, load resistance 1210 and control circuit 1246 perform similar functions to switches 802, 804, 820 and 822, switch node 818, auxiliary switch node 824, bidirectional switch 845 (including transistors 842 and 844),along with inductors 816 and 806, load capacitor 808, load resistance 810 and control circuit 846, respectively, in FIG. 8. Controller 1280 implements the switching sequences to operate the buck converter of circuit 1200 including the delayed turn off of the auxiliary switch Sa1, and the delayed turn on of switch S1 after that event, the turn on of the bidirectional switch and other switching sequences that are used in the embodiments as described hereinabove to improve the performance of the ZVT converter. Controller 1280 also controls the gate voltages for other portions of the converter operating cycle to regulate the output voltage. The inputs to controller 1280 include the input voltage Vin, the output voltage Vout, the switch node voltage $V_{sw}$, auxiliary switch node and voltage input Aux In.

Controller 1280 can be implemented in a variety of ways, for example as circuits including, as non-limiting examples, a microcontroller, microprocessor, CPU, DSP, RISC, ARM core or other programmable logic, as a dedicated logic function such as a state machine, and can include fixed or user programmable instructions. Further, as an alternative embodiment, controller 1280 can be implemented on a separate integrated circuit, with the switches S1, S2, Sa1, Sa2, 1242, 1244, and the remaining passive analog components, implemented on a stand-alone integrated circuit. In an alternative, one or more of switches S1, S2, Sa1, Sa2, 1242, 1244 and the remaining passive analog components may be implemented in the same substrate as controller 1280. Controller 1280 can be implemented as an application specific integrated circuit (ASIC), using field programmable gate arrays (FPGAs) or complex programmable logic devices (CPLDs) and the like. The sequencing and timing control of the novel arrangements can be implemented as software, firmware or hardcoded instructions. Delay lines and counters and the like can be used to determine the delays and timing, as determined by a particular hardware designer.

Because the embodiments are implemented as changes in the sequence of gate signals applied to the transistors of a converter, the arrangements can be utilized in existing ZVT converter circuits by the modification of software and some sensing hardware including adding the bi-directional switches across the auxiliary inductor, and thus the embodiments can be used to improve the performance of prior existing systems without the need for entire replacements of the converter hardware.

Modifications are possible in the described embodiments, and other embodiments are possible within the scope of the claims.

What is claimed is:
1. An apparatus, comprising:
a first switch having a control terminal, a first current handling terminal coupled to a voltage source, and having a second current handling terminal coupled to a switch node;

a second switch having a control terminal, a first current handling terminal coupled to the switch node, and having second current handling terminal coupled to a voltage reference;

a first inductor having one terminal coupled to the switch node and a second terminal coupled to a load terminal;

a third switch having a control terminal, a first current handling terminal coupled to the voltage source and second current handling terminal coupled to an auxiliary node;

a fourth switch having a control terminal, a first current handling terminal coupled to the auxiliary node and a second current handling terminal coupled to the voltage reference;

a second inductor having a first terminal coupled to switch node and a second terminal coupled to the auxiliary node;

a fifth switch having a control terminal, a first current handling terminal coupled to the switch node and the first terminal of the second inductor and a second current handling terminal coupled to the auxiliary node and the second terminal of the second inductor; and timing circuitry configured to output control signals to the control terminals of the first switch, the second switch, the third switch, the fourth switch and the fifth switch to supply current to the load terminal.

2. The apparatus of claim 1 in which the fifth switch is a bidirectional switch.

3. The apparatus of claim 2 in which the bidirectional switch includes first and second field effect transistors having a common drain connection and a source of the first field effect transistor coupled to the first current handling terminal of the fifth switch and a source of the second field effect transistor coupled to the second current handling terminal of the fifth switch.

4. The apparatus of claim 3 in which the first and second field effect transistors of the bidirectional switch are LDMOS transistors.

5. The apparatus of claim 1, in which the first, second, third, fourth and fifth switches are LDMOS transistors.

6. The apparatus of claim 1, and further including an extended drain MOS transistor having a drain terminal coupled to the auxiliary node in a source follower configuration and having a control terminal coupled to the timing circuitry.

7. The apparatus of claim 6, in which the extended drain MOS transistor has a control terminal coupled to the control terminal of the first switch.

8. The apparatus of claim 1, which the timing circuitry is further configured to couple a first closed signal to the control terminal of the third switch before coupling a first open signal to the control terminal of the second switch, to couple a second open signal to the control terminal of the third switch a first selected time after the first open signal, to couple a third closed signal to control terminal of the fourth switch a second selected time after the second open signal, to couple a fourth closed signal to the control terminal of the first switch a third selected time after the third closed signal, and to couple a third open signal to the control terminal of the fourth switch after the third closed signal, and to couple a fourth open signal to the control terminal of the first switch after the third open signal, the timing circuitry configured to detect if a high voltage is on the first terminal of the second inductor after the third open signal on the control terminal of the fourth switch and couple a fourth closed signal on the control terminal of the fifth switch before the fourth open signal if a high voltage is detected on the first terminal of the second inductor after the third open signal.

9. The apparatus of claim 8 in which the timing circuit is further configured to begin the fourth closed signal a fourth selected time before the fourth open signal.

10. The apparatus of claim 9 in which the timing circuitry is further configured to provide a fifth open signal coupled to the control terminal of the fifth switch a fifth selected time after the fourth open signal.

11. The apparatus of claim 1 in which the timing circuitry is a controller integrated circuit.

12. A method, comprising:

executing a plurality of cycles for a power converter, each cycle including:

turning on a first switch during a first period, the first switch having a first current handling terminal coupled to a first terminal of a power supply and a second current handling terminal coupled to a switch node coupled to a terminal of a first inductor, the first inductor having another terminal coupled to a first terminal for supplying a current output to a load;

turning on a second switch during a second period, the second period occurring after the first period such that the first switch and second switch are not turned on simultaneously, the second switch having a first current handling terminal coupled to the switch node and a second current handling terminal coupled to a second terminal of the power supply;

turning on a third switch at a first time during the second period and turning the third switch off at a second time after the second period but before a beginning of the first period of a succeeding cycle, a first current handling terminal of the third switch coupled to the first terminal of the power supply and a second current handling terminal coupled to an auxiliary node and to a first terminal of a second inductor, a second terminal of the second inductor coupled to the switch node;

turning on a fourth switch at a third time after the second time and turning the fourth switch off during the first period of the succeeding cycle, the fourth switch having a first current handling terminal coupled to the auxiliary node and a second current handling terminal coupled to the second terminal of the power supply; and turning on a fifth switch during a third period at an end of the first period if the voltage on the first terminal of the second inductor is high after the second period, the fifth switch having a first current handling terminal coupled to the auxiliary node and a second current handling terminal coupled to the switch node.

13. The method of claim 12 in which the fifth switch is a bidirectional switch.

14. The method of claim 13 in which the bidirectional switch includes first and second field effect transistors having a common drain connection and a source of the first field effect transistor coupled to the auxiliary node and a source of the second field effect transistor coupled to the switch node.

15. The method of claim 12 in which the third period begins a first selected time before the end of the first period and ends a second selected time after the end of the first period.

16. The method of claim 15 in which the first selected time is 5 nanoseconds and the second selected time is 15 nanoseconds.

17. An integrated circuit for controlling a switched power converter, comprising:
- a first switch control output;
- a second switch control output;
- a third switch control output;
- a fourth switch control output;
- a fifth switch control output;
- a switch node voltage input;
- an auxiliary switch node voltage input; and
- timing circuitry, configured:
  - to cause a first closed signal on the third switch control output before a first open signal on the second switch control output; to cause the third switch control output to provide a second open signal after a first selected time after the first open signal, to cause the fourth switch control output to provide a third closed signal a second selected time after the second open signal and third open signal a third selected time after the third closed signal, and to cause the first switch control output to provide a fourth closed signal after the second open signal and a fourth open signal after the third open signal, the timing circuitry configured to detect if a high voltage is on the auxiliary switch node voltage input after the third open signal and to provide a fifth closed signal on the fifth switch control output during a transition from the fourth closed signal to the fourth open signal responsive to the detecting.

18. The integrated circuit of claim 17 in which the fifth switch control output is configured to control a bidirectional switch.

19. The integrated circuit of claim 17 in which the timing circuitry includes a drain-extended transistor in a source follower configuration, in which a drain of the drain-extended transistor is coupled to the auxiliary switch node voltage input.

20. The integrated circuit of claim 17 in which the first, second, third and fourth switch control outputs are configured to control a field effect transistor.

* * * * *